United States Patent [19]

Leutenegger

[11] 4,129,038

[45] Dec. 12, 1978

[54] APPARATUS FOR INDICATING THE LEVEL OF LIQUIDS IN THE CONTAINERS OR WATERCRAFT

[75] Inventor: Bernhard Leutenegger, Münchenstein, Switzerland

[73] Assignee: Logotronic AG., Basel, Switzerland

[21] Appl. No.: 779,504

[22] Filed: Mar. 21, 1977

[30] Foreign Application Priority Data

Mar. 23, 1976 [DE] Fed. Rep. of Germany ....... 2612217

[51] Int. Cl.[2] ....................... F16K 31/18; G01F 23/08

[52] U.S. Cl. .......................................... 73/307; 116/4; 137/558

[58] Field of Search ................. 73/305, 307, 322, 311; 116/110, 4; 137/558, 386, 409, 415, 413

[56] References Cited

U.S. PATENT DOCUMENTS

| | | | |
|---|---|---|---|
| 77,809 | 5/1868 | Flinn | 73/307 |
| 3,054,419 | 9/1962 | Farrell | 137/415 X |
| 3,093,109 | 6/1963 | Pedersen | 73/322 X |
| 3,377,981 | 4/1968 | Hott et al. | 116/110 |
| 3,638,485 | 2/1972 | Knauth | 73/311 |
| 3,856,035 | 12/1974 | Fujiwara | 137/413 |
| 3,937,084 | 2/1976 | May | 73/307 |

FOREIGN PATENT DOCUMENTS

| | | | |
|---|---|---|---|
| 345776 | 5/1960 | Switzerland | 116/65 |

*Primary Examiner*—Daniel M. Yasich
*Attorney, Agent, or Firm*—Peter K. Kontler

[57] ABSTRACT

A signaling means to indicate levels in a liquid receiving compartment of a watercraft. The compartment contains a float which is connected to a piston by a vertical piston rod. The piston rises in a cylinder when the float rises in response to admission of liquid into the compartment whereby the piston effects two timely spaced compressions of a confined gas which actuates a pilot valve for a flow regulating valve when the pressure of confined gas reaches a preselected value. The regulating valve then admits compressed air to a device which furnishes visible signals and to a device which furnishes audible signals. The first set of signals warns the attendant that the compartment is about to be filed, and the second set of signals informs the attendant that the compartment is full. The attendant then closes a shutoff valve in the pipe which admits liquid into the compartment, and this results in automatic reduction of the pressure of confined gas.

32 Claims, 2 Drawing Figures

APPARATUS FOR INDICATING THE LEVEL OF LIQUIDS IN THE CONTAINERS OR WATERCRAFT

BACKGROUND OF THE INVENTION

The present invention relates to apparatus for indicating the level of liquids in and for preventing the overfilling of containers. More particularly, the invention relates to improvements in apparatus wherein the level of liquid in a container is monitored by a float or an analogous buoyant level detecting device. The apparatus of the present invention can be utilized with advantage for indicating the level of liquid in and for preventing the overfilling of compartments in watercraft, for example, to prevent overfilling of tanker compartments with volatile liquids whose vapors are readily combustible.

It is known to monitor the level of liquid in a container by means of a float or an analogous buoyant element which swims on the surface of the body of liquid and rises or falls, depending upon whether the container receives or discharges liquid. It is also known to couple the float with a piston which influences the pressure of a gaseous fluid (e.g., air) in a closed pneumatic system. The pressure of confined gas rises in response to rising level of liquid in the container. When the pressure of confined gas reaches a predetermined maximum permissible value, an actuating device which is directly or indirectly subjected to the pressure of confined gas closes a shutoff valve in the pipe which admits liquid into the vessel. A drawback of such apparatus is that each and every valve of a battery of shutoff valves must be coupled with a discrete actuating device. This contributes to the initial and maintenance cost, for example, when the liquid is to be admitted (via separate pipes) into each and every compartment of a large watercraft.

OBJECTS AND SUMMARY OF THE INVENTION

An object of the invention is to provide an apparatus which can indicate the level of liquid flowing into a container, e.g., into a compartment of a watercraft, and which can warn the attendant or attendants when the container is filled or about to be filled so that the valve or valves which admit liquid can be closed in good time by a crew member and automatic valve closing means can be dispensed with.

Another object of the invention is to provide an apparatus of the above outlined character which reduces the likelihood of fire and/or explosion when the container is to receive a flammable liquid or a volatile liquid which is likely to generate readily combustible and/or explosive vapors.

A further object of the invention is to provide an apparatus which can be used with advantage on tankers or other types of watercraft to monitor the degree of filling of one or more containers with liquids and to alert the crew in good time before the containers are filled or overfilled.

An additional object of the invention is to provide an apparatus which need not embody any electrical components to thus reduce the likelihood of combustion of flammable or explosive liquids.

Still another object of the invention is to provide an apparatus which can be installed in existing tankers or the like as a superior substitute for presently known apparatus wherein the valves which control the admission of liquids must be closed automatically when the liquid in the respective containers rises to a maximum permissible level.

A further object of the invention is to provide an apparatus which is automatically reset to the starting postion in response to evacuation of liquid from the monitored container or containers.

An ancillary object of the invention is to provide an apparatus which can alert the attendants in one or more different ways when the liquid in a container which is in the process of being filled rises to a preselected level, and which can alert the attendants at a single stage or at several successive stages of the filling cycle.

Another object of the invention is to provide an apparatus which, when installed in or on a watercraft, can be readily connected with land-mounted facilities for admission or evacuation of liquid from one or more containers of the watercraft.

A further object of the invention is to provide an apparatus which can automatically terminate the flow of liquid to a container when the liquid in the container rises to a predetermined level.

An additional object of the invention is to provide an apparatus whose condition can be readily determined prior to and/or during actual use.

Another object of the invention is to provide the apparatus with novel and improved means which allows for continuous determination of the liquid level in a container which is in the process of being filled with liquid and wherein such determination is rendered possible by component parts which perform other useful functions in addition to permitting the determination of degree of filling of the container with liquid.

The invention is embodied in an apparatus for indicating the level of liquid which is admitted into a container, e.g., into a container of a tanker or another watercraft. The apparatus comprises a float which is disposed in the container and rises with the rising level of liquid in the container, a piston which is connected with the float and is located outside of the container, means (e.g., a cylinder for the piston and a conduit which communicates with the interior of the cylinder) defining a gas-containing space a portion of which is bounded by the piston and whose volume decreases (with attendant compression of the confined gas) in response to upward movement of the float, and means pneumatically coupled to the gas for generating at least one (visible and/or audible) signal in response to sensed predetermined compression of the confined gas.

The apparatus preferably further comprises a regulating device (e.g., a first valve) which is actuatable to operate the signal generating means and means (e.g., a second valve which may constitute a diaphragm valve or an analogous pressure amplifier) for actuating the regulating device in response to predetermined compression of confined gas. The signal generating means preferably comprises at least one device which is operable by pressurized fluid (e.g., air) and is connected with a source of pressurized fluid by way of the regulating device when the actuating device detects that the pressure of compressed gas has risen to the predetermined value, i.e., when the container is filled or nearly filled with liquid.

If the signal generating means is designed to furnish visible signals, it may comprise a flag, a plate or an analogous device which is movable to and from an operative or exposed position and a pneumatic motor or analogous means for moving the flag or plate to the operative position in response to predetermined compression of the confined gas. The flag or plate is preferably provided with indicia which are observable in the operative position of the flag or plate and identify the container. Such identification is desirable when the container is one of several containers in a tanker or the like.

The just described indicia-bearing device can be provided in addition to one or more generators of audible signals, e.g., one or more horns which can furnish audible signals in response to connection with a source of pressurized fluid.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
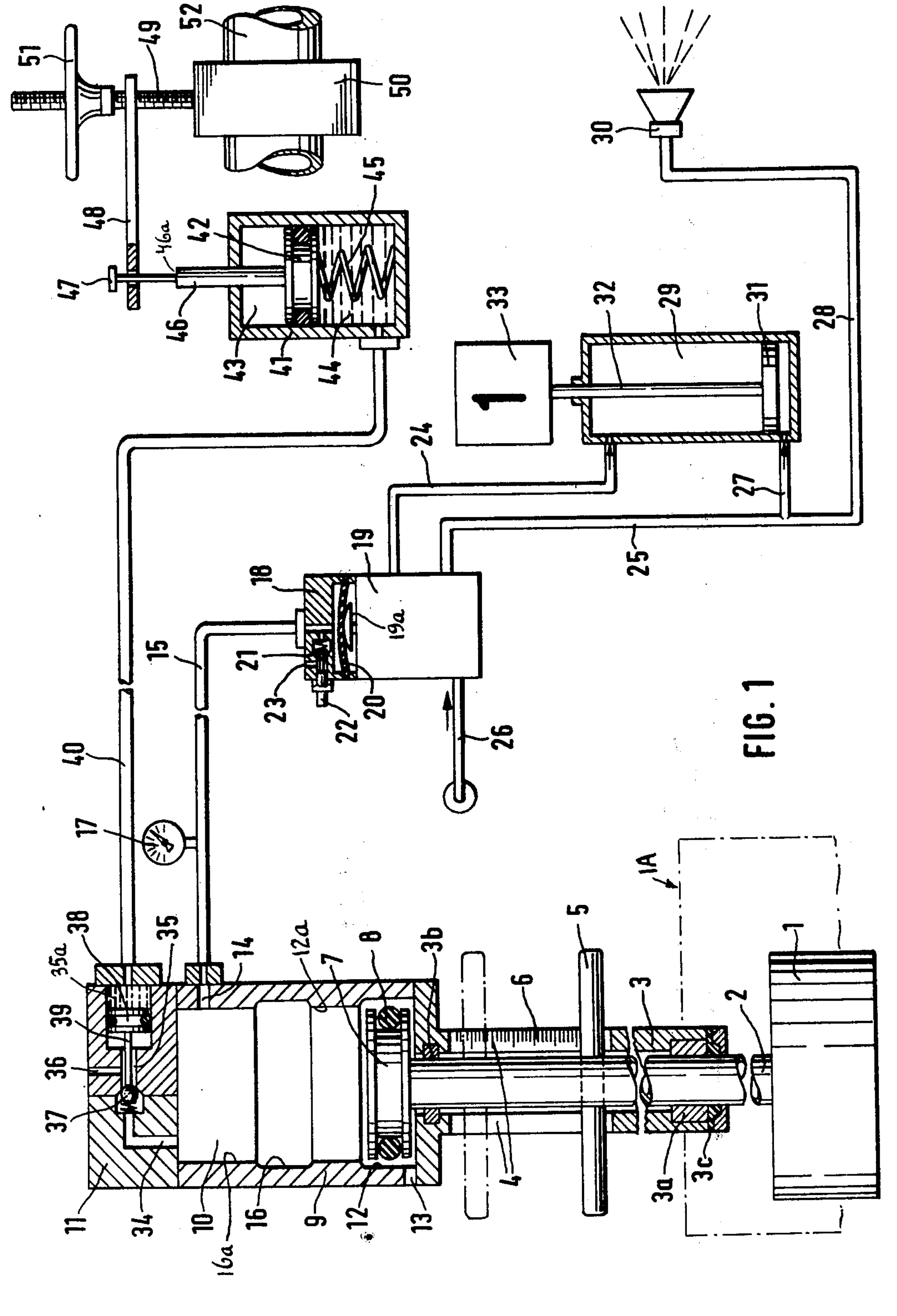
FIG. 1 is a schematic partly sectional view of an apparatus which embodies the invention and whose signal generating means includes devices for the simultaneous generation of visible and audible signals, first when the container is nearly filled and thereupon when the container is completely filled with a liquid.

The apparatus of FIG. 1 comprises a float 1 which swims on the surface of a supply of liquid in a container 1A (indicated by phantom lines). The container 1A may constitute one compartment of a watercraft, e.g., an oil tanker. The float 1 is connected to the lower end portion of a straight vertical piston rod 2 the upper end of which carries a piston 7 having a circumferential groove for a suitable sealing ring 8. The piston 7 is reciprocable in an upright cylinder 9 which is mounted at the upper end of a tubular guide member 3 for the piston rod 2. The guide member 3 has two vertically extending slots 4 which are located diametrically opposite each other and receive portions of a transverse pin or stud 5 which extends outwardly beyond both sides of the guide member. The latter carries a suitably graduated scale 6 which is adjacent to one leg of the pin 5 and can be read by an attendant to determine the degree of filling of the container 1A, i.e., the momentary level of the float 1. The guide member 3 contains two friction bearings 3*a*, 3*b* which are respectively mounted below and above the slots 4 and serve to slidably guide the piston rod 2. The lower end of the guide member 3 carries an annular sealing element 3*c* which seals its interior from the interior of the container 1A. This prevents vapors in the upper part of the container from entering the member 3. Such vapors will develop or are likely to develop if the container 1A is intended for storage of volatile liquids. Moreover, the sealing element 3*c* wipes the piston rod 2 when the latter rises so that the piston rod cannot entrain liquid into the interior of the guide member 3. This is important when the container 1A is intended for the storage of aggressive liquids which (or whose vapors) could attack the externally mounted components of the apparatus.

The upper end of the cylinder 9 is closed by a plate-like end wall or cover 11. The chamber 10 of the cylinder 9 has two larger-diameter sections 12, 16 and two smaller-diameter sections 12*a*, 16*a*. The section 12 is located at the lower end of the cylinder 9 and communicates with the surrounding atmosphere via one or more ports 13. Thus, the entire chamber 10 can communicate with the atmosphere when the float 1 permits the piston 7 to assume the lower end position which is shown in FIG. 1 because the diameter of the section 12 exceeds the maximum diameter of the piston 7 plus ring 8. The guide member 3 is rigid with the top wall of the container 1A and its lower end portion preferably extends into the uppermost part of the interior of the container.

The upper smaller-diameter section 16*a* of the chamber 10 communicates with a conduit 15 by way of a radial port 14 in the cylinder 9. The piston 7 compresses the gaseous fluid (air) in the chamber 10 when it moves above the section 12 so that its ring 8 sealingly engages the internal cylinder surface bounding the smaller-diameter section 12*a*. This causes the apparatus to produce two different preliminary signals which serve to apprise the attendant that the container 1A is about to be filled with liquid. The gas which causes the generation of such signals (in response to predetermined compression by piston 7) is confined in a space defined by an enclosure including the cylinder 9, conduit 15 and piston 7. The piston 7 constitutes a mobile boundary for the lower part of such space, and the volume of the space is reduced with attendant compression of the gas therein in response to upward movement of the piston. The pressure in the cylinder 9 decreases when the piston 7 rises to the level of the section 16 because the chamber portions above and below the piston are then free to communicate with the atmosphere via port 13. A second or final alarm is produced when the piston 7 rises above the section 16 so that its ring 8 sealingly engages the internal surface bounding the section 16*a*. The length of the piston rod 2 need not be such that the float 1 descends all the way to the bottom wall of the container 1A when the latter is empty. It suffices to employ a piston rod 2 which is long enough to insure that the rising liquid in the container 1A reaches and begins to lift the float 1 when the container is already filled to a predetermined level which might but need not be close to the maximum permissible level.

When the gas in the upper portion of the chamber 10 is compressed in response to movement of the piston 7 upwardly and beyond the section 12 (so that the upper portion of the chamber 10 is sealed from the port 13), the pressure in the conduit 15 also increases. This conduit is connected with a pressure gauge 17 which furnishes visual indications of gas pressure in the upper portion of the chamber 10. The scale of the gauge 17 is preferably calibrated in such a way that the angular position of the pointer (when the upper portion of the chamber 10 is sealed from the port 13) is indicative of the liquid level in the container 1A.

The right-hand end of the conduit 15 is connected with the inlet of a pressure amplifying valve or pilot valve 18 here shown as a diaphragm valve whose diaphragm or membrane 20 can displace the valving element 19*a* of an integrally connected flow regulating valve 19, preferably a 5/2-way valve of any suitable commercially available type. A suitable flow regulating valve is disclosed in Swiss Pat. No. 345,776 corresponding to U.S. Pat. No. 3,196,896 to which reference may be had, if necessary. The chamber above the diaphragm 20 receives fluid from the conduit 15 and can be evacuated in response to opening of a ball check valve 21. The latter is installed in a channel 23 which connects the chamber above the diaphragm 20 with the atmosphere when the check valve is open. The valve 21 closes automatically when the pressure of gaseous fluid in the conduit 15 rises. Means (e.g., a reciprocable pusher 22) is provided to open the check valve 21 at the will of the attendant, i.e., also at such times when the piston 7 compresses the gas in the upper portion of the chamber 10. The spring which biases the spherical element of the ball check valve 21 against its seat is not shown in FIG. 1. The valve 18 can be said to constitute a means for actuating the regulating valve 19 in response to changes in pressure of gas which is confined in the space defined by the cylinder 9 and conduit 15.

The axial length of sections 12*a* and 16*a* of the chamber 10 is selected in such a way that the compression of gas in the upper portion of the chamber 10 suffices to enable the valve 18 to actuate the valve 19 when the piston 7 respectively rises above the larger-diameter sections 12 and 16. The arrangement is preferably such that the compressive action of the piston 7 suffices even if the attendant accidentally opens the check valve 21 via pusher 22 while the container 1A receives one or more streams of liquid.

The regulating valve 19 can connect a source 26 of pressurized fluid (e.g., compressed air) with a conduit 24 or with a conduit 25. Furthermore, the valve 19 can connect the conduit 24 or 25 with the atmosphere. The conduit 25 has two branches 27, 28 which are respectively connected with the lower chamber of a double-acting piston valve or pneumatic motor 29 and with a pneumatically operated horn 30 which constitutes a device for the generation of audible signals. The upper chamber of the motor 29 is connected with the conduit 24. This motor forms part of a device for the generation of visible signals; its piston 31 is connected to the lower end of a piston rod 32 which carries a plate or flag 33 carrying one or more indicia which identify or denote the container 1A. For example, the indicia (numeral "1") on the flag 33 can be identical with those assigned to the respective container. It is clear that the flag 33 can carry indicia in the form of letters, entire words or combinations of letters and numerals. The flag 33 is moved to operative (raised) position when the valve 19 connects the source 26 with the conduit 25 and simultaneously connects the conduit 24 with the atmosphere.

The upper end of the chamber 10 in the cylinder 9 communicates with a channel or bore 34 which is machined into the end wall or cover 11 and communicates with a larger-diameter bore or valve chamber 35 for a ball check valve 37. The bore 35 communicates with the atmosphere by way of a venting orifice 36 which is machined into the cover 11 downstream of the seat of the check valve 37. When the pressure of gas in the upper portion of the chamber 10 rises, the spherical valving element of the check valve 37 is urged against its seat and seals the bore 34 from the orifice 36. The cover 11 further receives a reciprocable piston 38 whose piston rod or stem 39 can be moved in a direction to the left to thereby move the spherical element of the check valve 37 to the open position even if the pressure in the upper portion of the chamber 10 is sufficiently high to normally maintain the check valve 37 in closed position. The chamber 35*a* for the piston 38 is connected to the lower chamber 44 of a single-acting hydraulic cylinder 41 by way of a pressure line 40. The piston 42 in the cylinder 41 is biased upwardly by a helical spring 45 and the upper chamber 43 of the cylinder 42 communicates with the atmosphere. The chambers 43, 44 are permanently sealed from each other by the annular sealing element of the piston 42. The piston rod 46 of the cylinder 41 extends upwardly and its upper end portion has a collar 47 disposed above a relatively long circumferential groove above an annular shoulder 46*a*. The groove receives the bifurcated or ring-shaped end portion of a motion transmitting link 48 which is movable up and down with the spindle 49 of a shutoff valve 50 in a pipe 52 which admits liquid to the container 1A. The tank or another suitable source which supplies liquid to the pipe 52 is not shown in FIG. 1. The spindle 49 moves up or down in response to rotation of an operating means here shown as a wheel 51. The liquid in the lower chamber 44 of the cylinder 41 is preferably (but need not be) oil.

The link 48 may be formed with a tapped bore for the spindle 49. Thus, if the nature of the shutoff valve 50 is such that its valving element moves up or down in response to rotation of the spindle 49 (while the axial position of the spindle remains unchanged), the link 48 moves up or down, depending on the direction of rotation of the spindle via wheel 51.

A tanker or an analogous watercraft normally comprises several liquid receiving containers. In order to allow for simultaneous filling of two or more containers, the apparatus preferably comprises a discrete unit (of the type shown in FIG. 1) for each container of a watercraft, preferably a discrete unit for each container of the largest watercraft which is to be charged with liquid. More specifically, the number of units in the improved apparatus (provided that the apparatus is intended to be used in connection with charging facilities for watercraft) should preferably equal the maximum number of containers in a watercraft which is berthed in a port that is equipped with apparatus embodying the invention. However, if desired, all of the units may comprise a common horn 30 or a common horn for two or more units. For example, and if the apparatus comprises a single horn 30, such horn (together with all of the valves 18–19 and motors 29) can be installed in a centrally located or otherwise readily accessible area of the watercraft. The conduits 15 are preferably thin hoses (which may consist of synthetic plastic material) which are laid from the respective cylinders 10 to the centrally located area for the horn 30 and valves 18–19. In order to protect the conduits 15 against damage, they may be shielded by a rigid tubular sheath. The sheath preferably surrounds at least those portions of conduits 15 which are laid on the deck of a watercraft.

The pipe which feeds liquid to or receives liquid from the pipes 52 (one of these pipes is provided for each container) is not shown in FIG. 1. Each pipe 52 (these pipes may constitute branches of the main pipe) contains a discrete shutoff valve 50.

When the compartment 1A is empty, the pin 5 abuts against the surfaces at the lower ends of the slots 4 and the piston rod 2 and float 1 assume their lower end positions by gravity. If the shutoff valve 50 is opened by rotating the wheel 51 in the appropriate direction, liquid begins to flow from the main pipe, through the pipe 52, and into the container 1A. Before the liquid level in the container 1A reaches the float 1, the attendant can test the condition of the apparatus by lifting the float 1 through the medium of the pin 5, i.e., the pin is lifted to move the piston 7 above the section 12 of the cylinder chamber 10 and to thus determine whether or not the motor 29 raises the flag 33 as well as whether or not the horn 30 produces an audible signal. If the test is satisfactory, the attendant knows that the apparatus will respond as soon as the liquid in the container 1A rises to the level at which the devices 29 and 30 produce preliminary alarm signals. The piston rod 2 and the float 1 descend by gravity as soon as the pin 5 is released by the attendant. This enables the upper portion of the chamber 10 to communicate with the atmosphere via port 13, and the pressure in the chamber of the valve 18 (above the diaphragm 20) drops sufficiently to allow the conduit 25 to communicate with the atmosphere, i.e., the horn 30 ceases to furnish an audible signal and the flag 33 descends to the lower end position which is shown in FIG. 1 and in which the flag can be concealed from view.

As the pipe 52 continues to admit liquid into the container 1A, the liquid reaches and begins to lift the float 1, together with the piston rod 2 and piston 7. This preferably takes place shortly before the container 1A is filled to the maximum permissible level. The rising piston 7 advances above the section 12 and its ring 8 seals the port 13 from the upper portion of the chamber 10. The gas in the upper portion of the chamber 10 is gradually compressed while the piston 7 rises in the section 12a. The compression of gas suffices to cause the valves 18 and 19 to actuate the horn 30 and to cause the motor 29 to lift the flag 33 before the piston 7 reaches the larger-diameter section 16, i.e., before the upper portion of the chamber 10 is again free to communicate with the atmosphere via port 13. When the flag 33 is lifted, the valve 19 connects the conduit 25 with the source 26 and allows the conduit 24 to communicate with the atmosphere. The alarm signals which are furnished by the horn 30 and motor 29 inform the attendant, in two different ways, that the container 1A is about to be filled and that the attendant should be ready to close the shutoff valve 50.

The generation of visual and audible signals is interrupted when the piston 7 enters the section 16. However, the piston 7 continues to rise and begins to compress the gas in the upper portion of the chamber 10 when its ring 8 reaches and begins to slide upwardly along the surface bounding the section 16a. The axial length of the section 16a is selected in such a way that the gas in the upper portion of the chamber 10 is again compressed to the extent which is necessary to cause the valve 18 to actuate the valve 19 and to cause renewed generation of visible and audible signals before the upper portion of the piston 7 reaches the port 14. In the meantime, the previously alerted attendant is on his way to or has reached the wheel 51. Thus, as soon as the devices 29 and 30 start to generate signals, the attendant begins to close the valve 50 whereby the link 48 moves downwardly and ultimately engages the shoulder 46a to lower the piston 42 against the opposition of the spring 45. Oil in the chamber 44 is pressurized and causes the piston 38 and piston rod 39 to open the check valve 37 so that the upper portion of the cylinder chamber 10 is free to communicate with the atmosphere via orifice 36. Thus, the pressure of gas in the space above the piston 7 drops sufficiently to enable or cause the valve 18 to reset the valve 19 so that the flag 33 descends and the horn 30 ceases to produce an audible signal. This takes place when the valve 50 is closed. The flag 33 can descend by gravity and/or in response to admission of compressed gas into the upper chamber of the motor 29 (via conduit 24) when the conduit 25 communicates with the atmosphere. The termination of visible and audible signals takes place simultaneously with, shortly before, or immediately after complete closing of the valve 50.

The degree of filling of the container 1A with liquid can be determined by reading the position of the pin (pointer) 5 relative to the scale 6 on the guide member 3. If the attendant is close to the scale 6 at the time the apparatus furnishes preliminary visible and audible signals, such attendant can observe the upward movement of the float 1 and can decide when to leave for the wheel 51.

When the contents of the container 1A are to be transferred into an onshore tank, the outlet of the container is connected with a pipe corresponding to the pipe 52 but discharging into the tank. As the liquid flows from the container 1A, the float 1 descends by gravity. While the piston 7 descends in the section 16a (and thereupon in the section 12a) of the cylinder chamber 10, it draws air into the upper portion of the chamber 10 via orifice 36 of the cover 11 and bore 23 of the valve 18. Additional air can flow into the chamber 10 as soon as the piston 7 reaches the lower end position of FIG. 1 because the chamber 10 then also receives air via port 13.

The container 1A is ready to receive a fresh supply of liquid as soon as the pipe 52 is connected with a pipe which supplies liquid and the wheel 52 is rotated in a direction to open the shutoff valve 50 and to thereby move the link 48 above and away from the shoulder 46a. The spring 45 is free to expand and reduces the pressure of oil in the line 40. Therefore, the piston 38 is retracted by suction and allows the check valve 37 to seal the chamber 10 from the orifice 36 as soon as the pressure of gas in the chamber 10 begins to rise in response to upward movement of the piston 7 with the piston rod 2 and float 1. Thus, the apparatus is again ready to produce preliminary signals as soon as the piston 7 rises into and advances upwardly in the section 12a of the chamber 10. If desired, the piston 38 can be biased to the retracted position by one or more springs (not shown) whose bias is overcome as soon as the pressure of oil in the chamber 44 rises in response to closing of the shutoff valve 50.

As mentioned above, the attendant in charge will preferably test the apparatus before the liquid level in the container 1A reaches the float 1 (in the lowermost position of the float). This is achieved by lifting the pin 5 to determine whether or not the devices 29 and 30 will respectively generate visible and audible signals. It is immaterial whether the attendant raises the piston 7 into the section 12a or 16a because at least one of the valves 21, 37 opens while the piston 7 descends and tends to reduce the pressure of gas in the upper portion of the chamber 10 below atmospheric pressure.

It is also within the purview of the invention to omit the connection 40, 41, 48 between the valve opening piston 38 and the shutoff valve 50. Thus, the piston 38 may constitute or it may comprise a knob which can be depressed by hand to open the check valve 37 after closing of the shutoff valve 50. This terminates the generation of visible and audible signals because the orifice 36 admits air into the upper portion of the chamber 10 and the pressure in the conduit 15 drops sufficiently to enable the valve 19 to connect the conduit 25 with the atmosphere as well as to connect the conduit 24 with the source 26 of pressurized fluid. It is further clear that, if the connection 40, 41, 48 is omitted, the termination of generation of visible and audible signals can be effected by causing the pusher 22 to open the check valve 21 so that the upper portion of the chamber 10 receives air via bore 23 and conduit 15.

The apparatus can be simplified still further by replacing the cover 11 with a simple plate or end wall which airtightly seals the upper end of the chamber 10. This renders it possible to dispense with the valve 37, piston 38, conduit 40, cylinder 41 and link 48. The pressure of gas in the upper portion of the chamber 10 (subsequent to closing of the shutoff valve 50) is then relieved by depressing the pusher 22 to open the check valve 21. The generation of visible and audible signals is terminated as soon as the valve 18 causes or allows the valve 19 to respectively connect the conduits 24, 25 with the source 26 and the atmosphere.

An important advantage of the improved apparatus is that it need not (and preferably does not) have any electrical components. This reduces the danger of explosions or fire when the liquid which is caused to flow into or evacuated from the container 1A is a volatile liquid whose vapors are readily ignitable.

Figure 2:
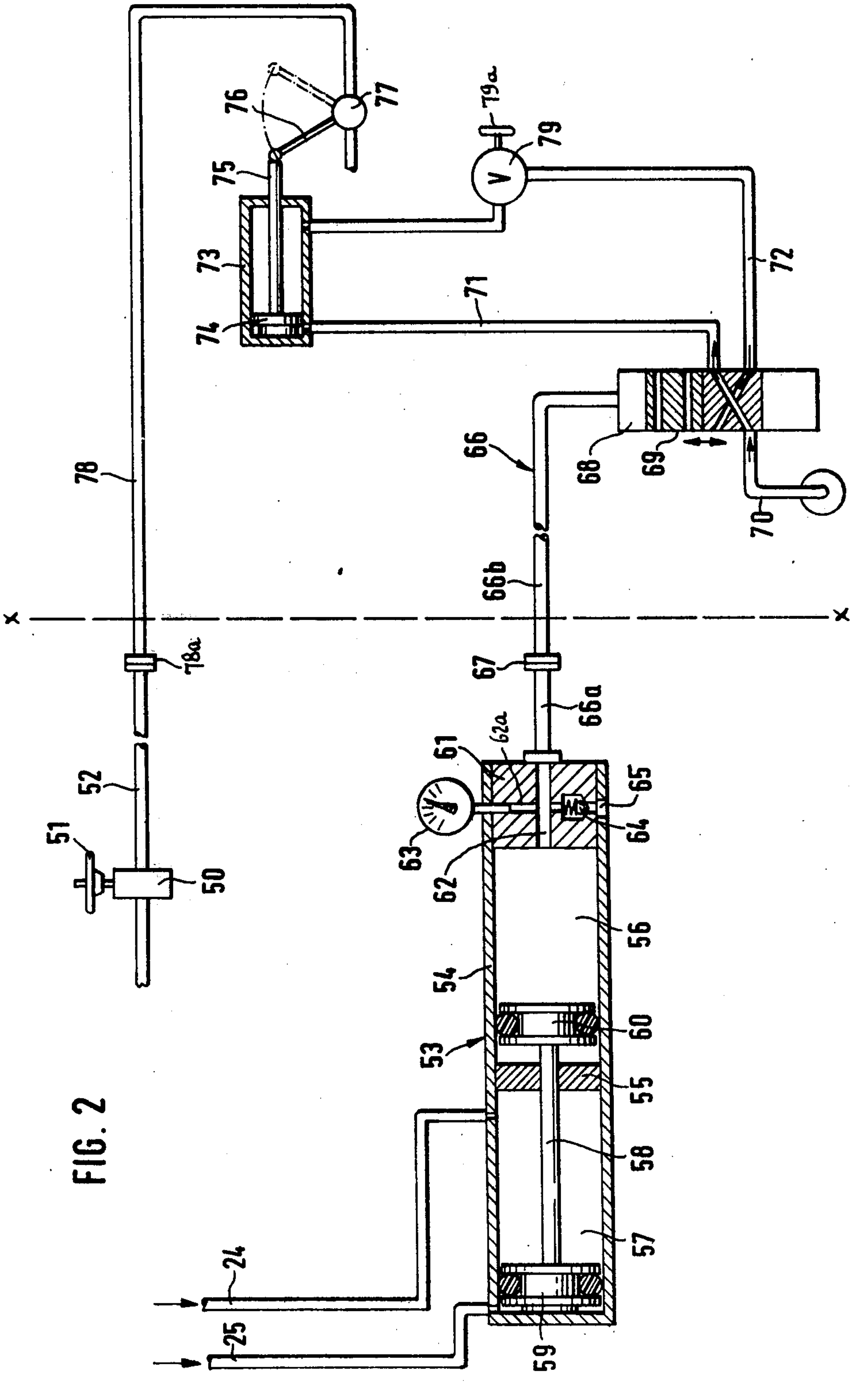
FIG. 2 is a schematic view of a portion of the apparatus of FIG. 1 and of pier-mounted facilities which can be coupled to the apparatus when a watercraft in or on which the apparatus is installed is berthed adjacent to the pier.

The improved apparatus can be readily combined with safety systems which are installed on a pier or in or on another facility which includes tanks for admission of liquid into or for reception of liquid from the containers of a watercraft. With reference to FIG. 2, the broken line X—X denotes the boundary between solid ground and a watercraft. The parts which are shown to the left of the line X—X are mounted on or in the watercraft, and the parts to the right of this line are mounted on solid ground. FIG. 2 further shows that the conduits 24', 25' wherein the flow of gas is controlled by the regulating valve 19 of FIG. 1 can be further connected to a pneumostatic transducer 53 which is mounted on the watercraft and comprises a cylinder 54 containing a partition 55 which divides its interior into two compartments 56 and 57. The partion 55 has a centrally located bore for a piston rod 58 whose ends are connected with pistons 59, 60. The pistons 59 and 60 are respectively reciprocable in the compartments 57 and 56. The conduit 25' can admit compressed gas into or evacuate gas from the compartment portion or chamber at the left-hand side of the piston 59, and the conduit 24' can admit compressed gas into or evacuate gas from the compartment portion or chamber at the right-hand side of the piston 59. The right-hand end of the compartment 56 contains a closure or plug 61 which has an axial channel or bore 62 and a transverse bore 62*a*. One end portion of the bore 62*a* can communicate with the atmosphere via port 65 of the cylinder 54 in response to opening of a ball check valve 64. The other end portion of the bore 62*a* (which communicates with the bore 62) is connected with a pressure gauge 63. The outer end of the bore 62 is connected with the left-hand portion 66*a* of a conduit 66 the right-hand portion 66*b* of which is connected to an amplifier valve 68. The sections 66*a*, 66*b* of the conduit 66 are separably connected to each other by a pipe coupling 67 of any suitable design. The valve 68 controls a flow regulating valve 69 which is connected with a source 70 of compressed gas (e.g., air) and with two conduits 71, 72. The valves 68, 69 are preferably analogous to or identical with the valves 18, 19 of FIG. 1. Thus, the valve 69 can be actuated by the valve 68 to connect the conduit 71 or 72 with the source 70 or with the atmosphere.

The conduits 71, 72 are connected with the respective chambers of a double-acting pneumatic motor 73 whose piston 74 is rigid with a reciprocable pump-actuating piston rod 75. The latter is articulately coupled to the motion receiving element 76 (e.g., a lever) forming part of a pump 77 in a main pipe 78 which is separably connected to the pipe 52 by a coupling 78*a*. The pump 77 can draw liquid from a tank to supply the withdrawn liquid into the pipe 78 and thence into one or more pipes 52 each of which contains a discrete shutoff valve 50. The conduit 72 contains a shutoff valve 79 which can be actuated by a depressible knob 79*a* or the like.

It is assumed that the pipe 52 shown in the left-hand portion of FIG. 2 is identical with the pipe 52 of FIG. 1, i.e., that it can admit liquid into the container 1A of FIG. 1 when the shutoff valve 50 is open. When the container 1A is filled and the valve 19 of FIG. 1 connects the conduit 25' with the source 26 of pressurized fluid, the conduit 24' communicates with the atmosphere. Therefore, the pressurized fluid which is admitted via conduit 25' causes the piston 59 of the transducer 53 shown in FIG. 2 to move in a direction to the right and to expel air from the right-hand portion of the compartment 57 via conduit 24' and valve 19. The piston 60 shares the rightward movement of the piston 59 and compresses air in the compartment 56 so that such air closes the check valve 64 and thus seals the compartment 56 from the port 65. Compressed air in the conduit 66 causes the valve 68 to actuate the regulating valve 69 in such a way that the valve 69 connects the source 70 with the conduit 71. The piston 74 shifts the piston rod 75 in a direction to the right and the lever 76 is moved to the broken-line position to thus arrest the motor of the pump 77. The conduit 72 communicates with the atmosphere.

When the attendant closes the shutoff valve 50 to seal the container 1A from the pipe 78, the pressure in the conduit 15 drops (either in response to automatic opening of check valve 37 via connection 48, 41, 40 or in response to manual opening of the check valve 21 and/or 37) and the valve 19 respectively connects the conduits 24', 25' with the source 26 and the atmosphere. The right-hand portion of the compartment 57 receives compressed gas via conduit 24' and the piston 59 is pushed back toward the end position of FIG. 2; it will be recalled that the conduit 25' then communicates with the atmosphere via valve 19. As the pistons 59 and 60 move toward the positions which are shown in FIG. 2, the pressure of air in the bore 62 decreases so that the valve 68 causes or allows the valve 69 to connect the conduit 71 with the atmosphere and to connect the conduit 72 with the source 70. If necessary, the check valve 64 opens in response to leftward movement of the piston 60 and admits atmospheric air into the compartment 56 of the cylinder 54.

The shutoff valve 79 is normally closed so that the connection of conduit 72 with the source 70 does not result in immediate starting of the pump 77. When the pipe 78 is connected with another compartment of one and the same watercraft or with a compartment of the next watercraft, the attendant depresses the pushbutton 79*a* to temporarily open the shutoff valve 79 whereby the conduit 72 admits pressurized fluid into the right-hand chamber of the motor 73 and causes the piston 74 to retract the piston rod 75 and lever 76 to the solid-line positions of FIG. 2. Thus, the pump motor is started and the pump 77 begins to supply liquid into the pipe 52. The provision of shutoff valve 79 constitutes a safety measure, i.e., the pump 77 can be automatically arrested when the container 1A is filled to the desired level; however, renewed starting of the pump motor can be effected only on land, i.e., when the attendant is convinced that the coupling 78*a* properly connects the pipe 78 with a pipe 52 which is connected to an empty container.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should are intended to be comprehended within the meaning and range of equivalence of the claims.

What is claimed is:

1. Apparatus for indicating the level of liquid which is selectively admitted into at least one container, comprising a float disposed in said container and arranged to rise with the rising level of liquid in the container; an enclosure having a space containing gas, said enclosure including a reciprocable piston connected with said float, located outside of said container and bounding a portion of said space, the volume of said space decreasing, with attendant compression of the gas therein, as a result of movement of said piston in response to upward movement of said float; pneumatic response means pneumatically coupled with the space for sensing gas compression in the space and responding to a predetermined compresson of gas in the space and signal generating means operatively connected to said pneumatic response means for generating at least one visible and/or audible signal when the response means senses the predetermined compression of gas in said space.

2. Apparatus as defined in claim 1, wherein the pneumatic response means comprises regulating means connected with said signal generating means and being actuatable to operate said signal generating means, and means for actuating said regulating means in response to said predetermined compression of gas in said space.

3. Apparatus as defined in claim 2, further comprising a source of pressurized fluid, said regulating means including a first valve which is actuatable to connect said signal generating means with said source whereby the pressurized fluid operates said signal generating means, said actuating means comprising a second valve which causes said first valve to connect said signal generating means with said source in response to said predetermined compression of gas in said space.

4. Apparatus as defined in claim 1, wherein said signal generating means comprises a fluid-operated device for generation of visible signals.

5. Apparatus as defined in claim 1, wherein said signal generating means comprises a fluid-operated device for generation of audible signals.

6. Apparatus as defined in claim 1, wherein said signal generating means comprises a device movable to and from an operative position and means for moving said device to said operative position in response to said predetermined compression of gas in said space, said device having indicia observable in said operative position and identifying said container.

7. Apparatus as defined in claim 1, wherein said piston has a piston rod connected to said float and said enclosure further includes a cylinder for said piston and a conduit communicating with the interior of said cylinder.

8. Apparatus as defined in claim 7, further comprising an upright tubular guide connected with said cylinder and said container and slidably receiving said piston rod, said guide extending into said container and having means for sealing its interior from the interior of said container.

9. Apparatus as defined in claim 7, further comprising a tubular guide connected with said cylinder and said container and slidably surrounding said piston rod, said guide having at least one longitudinally extending slot and said piston rod having a projection extending outwardly through said slot.

10. Apparatus as defined in claim 9, wherein said guide comprises a scale adjacent said projection and calibrated to facilitate determination of the level of said float in said container by observing the position of said projection with respect to said scale.

11. Apparatus as defined in claim 7, wherein said cylinder has a port remote from said conduit and in communication with the atmosphere, said cylinder further having a chamber forming part of said space and communicating with said port in that position of said piston which corresponds to the lowermost level of said float in said container.

12. Apparatus as defined in claim 11, wherein said chamber has a section which communicates with said port and receives said piston with radial clearance when said piston assumes said position.

13. Apparatus as defined in claim 12, wherein said chamber has a second section disposed between said first mentioned section and said conduit and receiving said piston with radial clearance when said piston moves to a second position in response to lifting by said floating by the rising liquid in said container, said conduit being free to communicate with said port in said second position of said piston.

14. Apparatus as defined in claim 13, wherein said chamber has a third section disposed intermediate said first mentioned and second sections and receiving said piston without radial clearance while the piston moves from said first mentioned to said second position whereby the piston seals said port from said conduit and pressurizes the gas in said chamber above said piston as well as in said conduit and the gas is subjected to said predetermined compression before said piston moves into said second section to again allow said conduit to communicate with said port.

15. Apparatus as defined in claim 14, wherein the axial length of said third section is such that said piston can subject the gas in said conduit to said predetermined compression even if the pressure of gas in said conduit is accidentally reduced during the initial stage of movement of piston in said third section toward said second section.

16. Apparatus as defined in claim 14, wherein said chamber has a fourth section which is disposed between said second section and said conduit and receives the piston without radial clearance while the piston moves therein whereby the piston again subjects the gas to said predetermined compression to thus effect renewed operation of said signal generating means.

17. Apparatus as defined in claim 16, wherein the axial length of said fourth section is such that said piston can subject the gas to said predetermined compression even if the pressure of gas in said conduit is accidentally reduced during the initial stage of movement of said piston in said fourth section toward said conduit.

18. Apparatus as defined in claim 7, wherein said cylinder has an end wall remote from said float and said end wall has a channel which connects said chamber with the atmosphere, and further comprising a valve installed in said channel and arranged to close in response to rising pressure of gas in said chamber, and means for opening said valve.

19. Apparatus as defined in claim 18, wherein said valve opening means comprises a reciprocable member mounted in said end wall and accessible at the outside of said cylinder.

20. Apparatus as defined in claim 18, wherein said valve opening means is accessible for manual actuation from the outside of said cylinder.

21. Apparatus as defined in claim 18, wherein said valve opening means comprises a reciprocable piston in said end wall and further comprising means for applying fluid pressure against said last mentioned piston to effect the movement of said valve to open position.

22. Apparatus as defined in claim 18, further comprising a pipe for admission of liquid to said container, a shutoff valve in said pipe, means for moving said shutoff valve between open and closed positions, and means for actuating said valve opening means in response to closing of said shutoff valve.

23. Apparatus as defined in claim 22, wherein said actuating means comprises at least one fluid-operated motor.

24. Apparatus as defined in claim 7, further comprising a pressure gauge connected with said space to indicate the pressure of confined gas.

25. Apparatus as defined in claim 24, wherein said signal generating means comprises at least one device which is operable by pressurized fluid to furnish the visible and/or audible signal and further comprising a source of pressurized fluid, a regulating valve installed between said source and said device, and an actuating valve for said regulating valve, said actuating valve being connected with said conduit and being responsive to said predetermined compression of confined gas to actuate said regulating valve so that the latter connects said device with said source, said pressure gauge being connected with said conduit.

26. Apparatus as defined in claim 1, further comprising means for regulating the operation of said signal generating means and means for actuating said regulating means in response to said predetermined compression of gas in said space, said actuating means including manually operable means for relieving the pressure of gas which is confined in said space.

27. Apparatus as defined in claim 1, wherein said signal generating means comprises a device for generation of a visible signal including a double-acting fluid operated motor having a piston movable between a first position in which said signal is visible and a second position, and further comprising a source of pressurized fluid, a regulating valve connected between said motor and said source and being actuatable to move said last mentioned piston to and from said first position, and a second valve for actuating said regulating valve so that said regulating valve moves said last mentioned piston to said first position in response to said predetermined compression of gas in said space and to said second position when the compression of gas in said space is reduced.

28. Apparatus as defined in claim 27, wherein said device further comprises a piston rod connected with said last mentioned piston and a carrier on said piston rod, said carrier being observable in said first position of said last mentioned piston and having indicia identifying said container.

29. Apparatus as defined in claim 1, wherein said signal generating means comprises a device for generation of the audible signal in response to admission of pressurized fluid thereto and further comprising a source of pressurized fluid, a regulating valve connected between said source and said device, and an actuating valve for said regulating valve, said actuating valve being arranged to actuate said regulating valve so that the latter connects said source with said device in response to said predetermined compression of gas in said space.

30. Apparatus as defined in claim 1, further comprising pipe means for supplying liquid to said container, pump means in said pipe means, and means for arresting said pump means in response to said predetermined compression of gas in said space.

31. Apparatus as defined in claim 30, wherein said container forms part of a watercraft and said pump means is mounted on land.

32. Apparatus as defined in claim 30, wherein said arresting means comprises a transducer.

* * * * *